Patented June 5, 1951

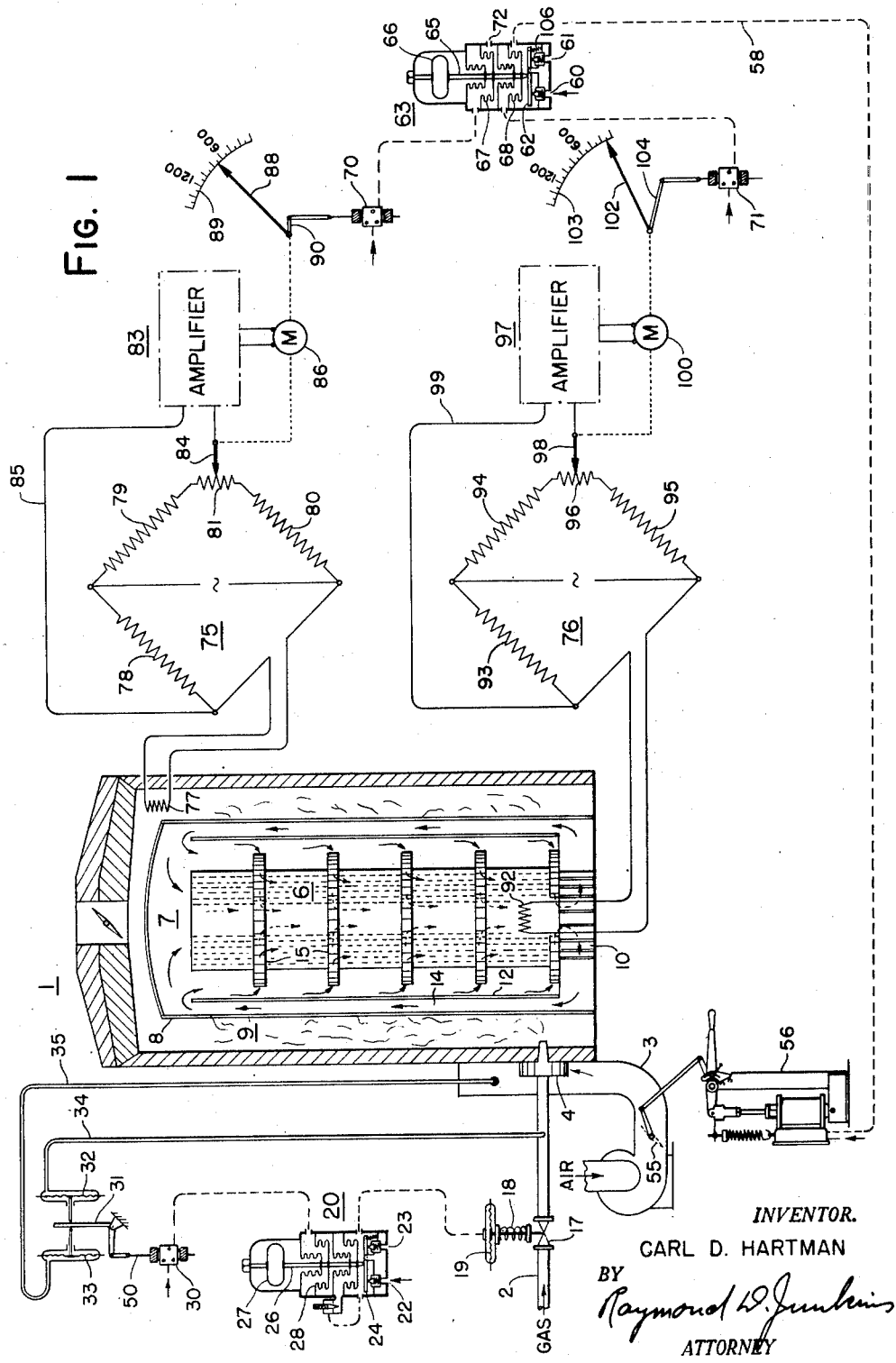

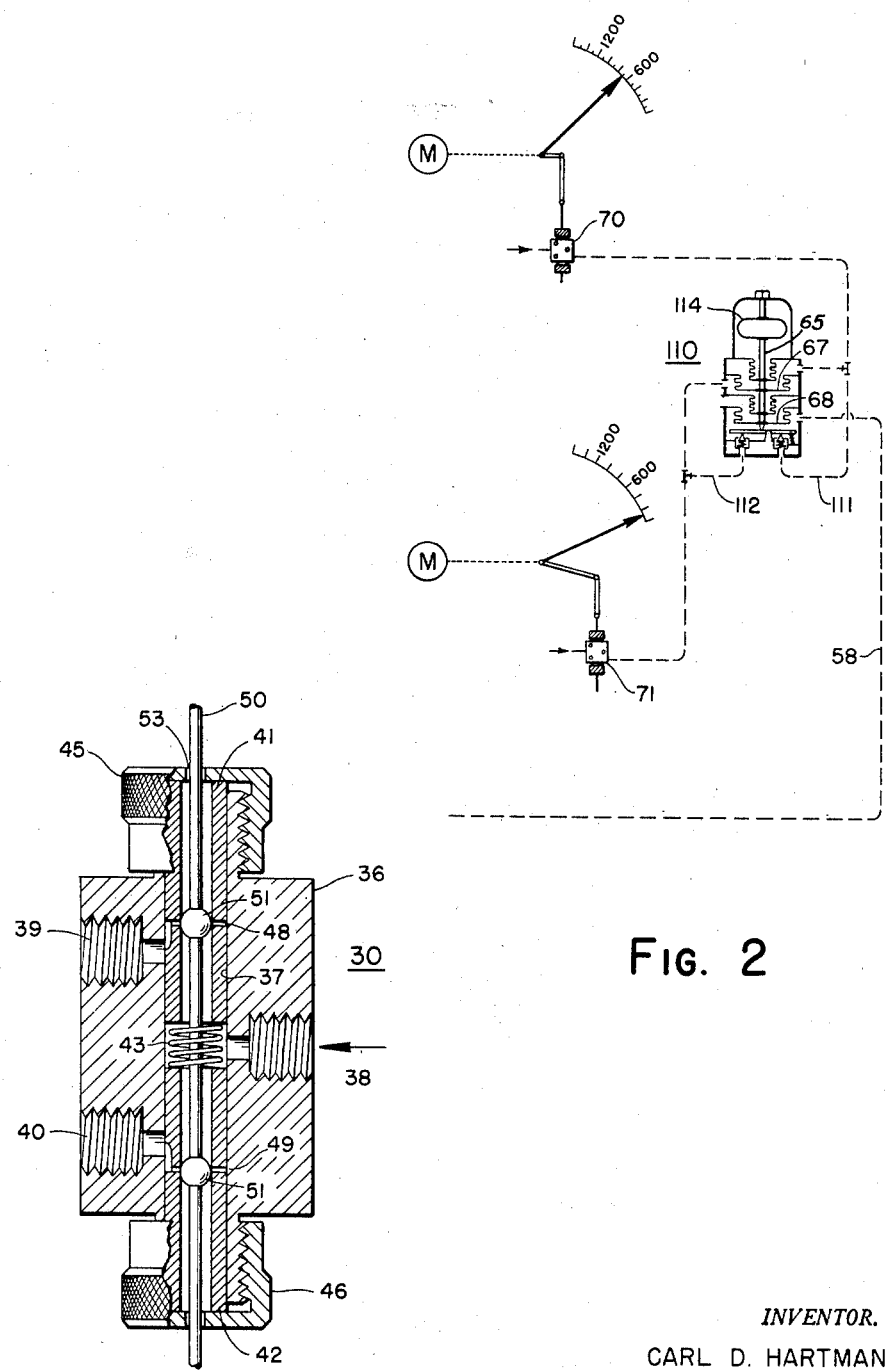

2,556,081

UNITED STATES PATENT OFFICE 2,556,081

FURNACE CONTROL SYSTEM

Carl D. Hartman, Pittsburgh, Pa., assignor to Bailey Meter Company, a corporation of Delaware Application October 24, 1947, Serial No. 781,806

12 Claims. (Cl. 236—15)

This invention relates to control systems for furnaces, and more particularly to systems operating in response to temperatures for controlling the operation of an annealing furnace.

In the operation of an annealing furnace it is desirable, for the sake of efficiency, that the temperature of the article being annealed be brought as quickly as possible to its annealing temperature. To accomplish this the furnace is heated at a temperature well above the annealing temperature until the article approaches the latter temperature, and then the furnace temperature is decreased to a value sufficient to maintain the article at its annealing temperature. The desired temperatures may be controlled automatically during the annealing process by regulating the supply of fuel and air to the furnace in response to changes in both the furnace temperature and the temperature of the article being heated. A means responsive to the furnace temperature may regulate the supply of fuel and air to obtain a rapid heating of the furnace to the maximum temperature that may be safely maintained therein, and a second means responsive to the temperature of the article may operate when the annealing temperature is reached to override the first means and regulate the supply of fuel and air so as to reduce the furnace temperature to the value necessary to hold the article at the annealing temperature.

A preferred form of my invention may include balanceable circuits, one of which is arranged to be unbalanced in response to changes in furnace temperature and the other arranged to be unbalanced in response to changes in the temperature of the article being annealed. Reversible motors may be provided to operate on an unbalance of the circuits for rebalancing the latter and positioning pilot valves to supply pressure fluid to a relay which determines a pressure controlling the supply of fuel and air to the furnace. When the furnace temperature and the temperature of the article are both low, the pressure from the relay may be such as to effect a supply of fuel and air to produce a rapid heating of the furnace. As the furnace temperature approaches its maximum value, one of the pilot valves may be actuated to vary the pressure on the relay so that the latter operates to prevent further increase in furnace temperature. As the article heated approaches its annealing temperature, the other pilot valve may be actuated to regulate the pressure on the relay in such a way that it operates to effect a reduction of the fuel and air supply until the furnace temperature reaches a value only sufficient to hold the temperature of the article constant.

An object of my invention is to provide an improved control system for a furnace. Another object is to provide an improved system which operates to control the heating of a furnace so that its temperature is increased rapidly to a maximum value and then held at such value until the temperature of an article heated thereby reaches a predetermined value, after which time the temperature of the furnace is regulated to maintain the temperature of the article at the predetermined value. Other objects will appear in the course of the following description.

In the accompanying drawings there are shown for purposes of illustration two forms which my invention may assume in practice.

In these drawings:

Fig. 1 is a schematic diagram of one form which my improved control system may assume in practice.

Fig. 2 is a schematic diagram showing a portion of another form of my control system.

Fig. 3 is an enlarged sectional view of a pilot valve employed in my control system.

Referring to the drawings it will be noted that there is shown in Fig. 1 a furnace, generally designated 1, to which a fuel, such as gas, is supplied through a conduit 2. Air supplied through a conduit 3 is admitted to a nozzle 4 connected to conduit 2 and mixes with the gas supplied to the furnace for supporting combustion in the latter. The furnace, as shown herein, is adapted for annealing articles 6, such as coils of sheet metal, and is provided with an annealing chamber 7 having its walls 8 spaced from the walls of the furnace to form an annular space 9 in which combustion takes place. The coils of sheet metal are shown stacked within the annealing chamber above a fan 10, and a baffle 12 extends along the stack of coils to form an annular space 14 through which an inert gas may be circulated by the fan to the upper end of the chamber 7 where it passes downwardly over the coils to the intake side of the fan. Arranged between the coils are finned spacers 15 which permit the circulated gas to gain admission to the ends of the coils at different points along the stack.

Arranged in the conduit 2 is a valve 17 which is normally held in an open position by spring 18 and is adapted to be moved toward its closed position by a fluid actuated diaphragm 19. A relay 20 is provided for controlling the pressure on the diaphragm by connecting the latter either to a fluid supply port 22 or to an exhaust port 23. Valve means positioned by a pivoted beam 24 controls the connection to the fluid supply and exhaust ports, and a member 26 urged in opposite directions by a spring 27 and a fluid actuated diaphragm 28 determines the positions of the pivoted beam. If the pressure on diaphragm 28 overcomes the force of the spring 27, the pressure supplied to the diaphragm 19 is increased as long as the unbalance exists. If the spring overcomes the action of the pressure on diaphragm 28, the pressure on diaphragm 19 is decreased. When the forces urging the member 26 in opposite directions become equal, the pressure supplied to the diaphragm 19 is held constant at the value existing at the time the balance is reached. This relay is disclosed in the Patent Re. 21,804 issued to H. H. Gorrie on May 20, 1941. It forms no part of my invention and further description of the same herein is believed to be unnecessary.

Pressure is supplied to the diaphragm 28 from a pilot valve 30 which is connected to a bell crank 31 positioned by diaphragms 32 and 33. Conduits 34 and 35 connect opposite surfaces of the diaphragms 32, 33, respectively, to the conduits 2 and 3 adjacent the nozzle 4.

The valve 30, as shown in Fig. 3, comprises a block 36 having a bore 37 extending through it. A fluid supply port 38 opens into the bore at a point midway between its ends, and discharge ports 39 and 40 open into the bore at opposite sides of the supply port. When only one of the discharge ports is needed, as in the control of fluid pressure to the relay 20, suitable means may be employed for plugging the other port. Slideably received in the bore 37 are sleeve shaped members 41 and 42 urged outwardly by a spring 43 into engagement with caps 45 and 46 threaded upon projecting portions of the valve block. Formed in the sleeves 41 and 42 between their ends are passage means 48 and 49 adapted to communicate with the discharge ports in various adjusted positions of the sleeves. Extending through the sleeves is a valve stem 50 having enlarged portions 51 controlling communication between the interiors of the sleeves and the passage means 48, 49. Formed in the caps 45, 46 are ports 53 connecting the outer ends of the sleeves in free communication with the atmosphere. This valve is disclosed in the Patent 2,054,464 issued to C. Johnson on September 15, 1936, and forms no part of my present invention.

By adjusting the caps 45, 46, the sleeves may be positioned relative to the enlargements 51 so that any desired pressure may be obtained at the discharge ports. The adjustment for the valve 30 is made such that the pressure supplied to the relay 20 balances the force exerted by the spring 27 when the ratio of air flow to fuel flow is at the correct value. It will be seen that any decrease in the air flow will result in a reduction of the pressure on diaphragm 33 and a movement of the valve stem 50 to increase the flow of pressure from the supply port 38 to the discharge port 40 communicating with the relay 20. This pressure fluid will act on the diaphragm 28 and overcome the tension of the spring 27 to increase the supply of pressure fluid to the diaphragm 19 and effect a closing movement of the valve 17. As this valve closes, the pressure in conduit 2 at the discharge side of the valve decreases. This decreased pressure acting through conduit 34 on the diaphragm 32 permits a movement of the valve stem 50 to decrease the flow of pressure fluid to the relay 20. As soon as the pressure on the diaphragm 28 of relay 20 returns to a value which balances the spring 27, the pressure on diaphragm 19 is held at the value which caused the valve to move to its partially closed position. Any increase in the air pressure in conduit 3 will result in an unbalance of the relay 20 to decrease the pressure on diaphragm 19 and effect an opening of valve 17 until the pressure in conduit 2 reaches a value which restores the balance of the relay.

For controlling the flow of air in conduit 3 there is provided a damper 55 connected to a fluid actuated mechanism 56 which operates when pressure fluid is supplied to it to move the damper toward its open position. Suitable passage means 58 leading from the mechanism 56 is connected to a fluid supply port 60 or an exhaust port 61 under the control of valves positioned by a pivoted beam 62 which forms part of a relay mechanism 63. A member 65 acts upon the pivoted beam and is connected to a spring 66 and to diaphragms 67 and 68. Pressure fluid is supplied to the upper sides of the diaphragms under the control of pilot valves 70 and 71, similar to the pilot valve 30, and the pressure delivered by the relay to the passage means 58 acts upon the lower side of diaphragm 68. The lower side of the diaphragm 67 is subjected to atmospheric pressure through a port 72.

For controlling the pilot valves 70 and 71 there are provided balanceable bridge networks 75 and 76 which are responsive to the furnace temperature and the temperature of the articles 6, respectively. The network 75 is shown herein as a resistance bridge having an element 77 varying in resistance with the temperature of the furnace and forming one of its legs, a fixed resistance 78 forming another leg, and resistors 79 and 80 combined with variable portions of a potentiometer resistance 81 to form the remaining legs. An amplifier 83 is connected to a movable contact 84 for the resistance 81 and to a diagonally opposite point of the bridge through a conductor 85 for controlling the operation of a motor 86. The amplifier may be like that disclosed in the Ryder Patent 2,275,317, issued March 3, 1942, and effect operation of the motor in one direction or the other depending upon the direction of bridge unbalance. The motor is connected to the contact 84 for positioning the latter in a direction to rebalance the bridge, and is connected to an indicator 88 for moving the latter relative to a scale 89 to indicate the temperature of the furnace. An arm 90 fixed for movement with the indicator is operatively connected to the valve stem 50 of the valve 70 for regulating the flow of pressure fluid to the diaphragm 67.

The bridge 76 is provided with an element 92 varying in resistance with changes in temperature of the article 6 and forming one of the bridge legs. A fixed resistance 93 forms another leg, and resistors 94 and 95 combined with portions of a resistance 96 form the remaining legs of the bridge. An amplifier 97 like the amplifier 83 is connected to a movable contact 98 for the resistance 96, and to a diagonally opposite point of the bridge through a conductor 99 for effecting operation of a motor 100 on bridge unbalance. The motor is connected to the contact 98 for positioning it to rebalance the bridge, and is connected to an indicator 102 which cooperates with a scale 3 for indicating the temperature of the articles 6. An arm 104 is fixed for movement with the indicator 102 and is connected to the valve stem of the pilot valve 71 for regulating the flow of pressure fluid to the diaphragm 68.

The pilot valves 70 and 71 are shown with their discharge ports 40 connected in communication with the diaphragms 67 and 68. The discharge ports 39 may be plugged by any suitable means. The pilot valve 70 is adjusted by varying the position of the valve sleeve 42 or by changing the position of the valve stem through its connection to the arm 90, so that the lower valve enlargement 51 is spaced below the passage means 49 and offers no interference with the flow of fluid to the port 40 while the furnace temperature is low. As the temperature increases, the enlargement is moved toward the passage means 49 but does not reach a point to interfere with fluid flow until the temperature approaches the maximum desired value. The connections 90 to the valve stem are made to move the valve stem in such a way that a change of something like 100° in furnace temperature will be required to move the lower enlargement 51 from a position where it begins to interfere with flow to a point where it completely cuts off the flow and vents the port 40 to atmosphere. The enlargement 51 fits loosely enough in the valve sleeve so that there is a small continuous leak of pressure to the atmosphere. The pilot valve 71 is adjusted similar to valve 70 so that interference with fluid flow to diaphragm 68 does not take place until the articles 6 are heated almost to their annealing temperature. The connections to this valve are arranged, however, so that a change of something like 20° will be sufficient to move the valve stem from a position where no interference is offered to the flow of fluid to a position where the flow is entirely cut off.

When the articles are first placed in the furnace and the temperature of each is low, the pilot valves 70 and 71 supply fluid to the diaphragms 67 and 68 at such a pressure that each exerts a downward force of something like 20 lbs. on the member 65. The spring 66 is adjusted at this time to produce an opposing force of the same value. Since each of the diaphragms is exerting a force equal to that of the spring, the member 65 will be actuated to open the valve to the supply port 69 until the pressure at the lower side of diaphragm 68 exerts an upward force of 20 lbs. on the member 65. This pressure will pass through the passage means 58 to the mechanism 56 for actuating the latter to move the damper to its open position. The air pressure in conduit 3 will effect an operation of the relay 20 to open the valve 17 and permit gas to enter the furnace in sufficient quantity for heating the latter rapidly. As the furnace approaches its maximum temperature, the valve 70 reduces the pressure on diaphragm 67. The pressure acting on the lower side of diaphragm 68 with the tension of spring 66 is then sufficient to raise the member 65 and permit the beam 62 to be moved by a spring 106 to open the valve to the exhaust port 61 until the pressure at the lower side of the diaphragm 68 is equal to that at the upper side of the diaphragm 67. This reduced pressure acting on the mechanism 56 permits the latter to operate and move the damper toward its closed position. The pressure in the air conduit is thus reduced and causes the relay 20 to operate and increase the pressure on diaphragm 19 for moving the valve 17 toward its closed position. The heating of the furnace is thereby regulated to hold it approximately at the maximum desired value.

As the articles 6 approach the annealing temperature, the pilot valve 71 operates to reduce the pressure on the diaphragm 68. The member 65 is then moved upwardly to permit a further drop in the pressure beneath the diaphragm 68. It will be seen that the pressure beneath the diaphragm 68 when the relay is balanced is always equal to the difference between the tension of the spring 66 and the sum of the forces exerted downwardly on the member 65 by the diaphragms 67 and 68. The reduced pressure supplied from the relay 63 to the mechanism 56 causes a further reduction in the supply of air and fuel to the furnace. The furnace temperature then drops from its maximum value and causes the pilot valve 70 to deliver fluid at maximum pressure to the relay 63. This pressure is only sufficient to counterbalance the force of the spring 66. The pressure delivered by the relay 63 is then equal to the pressure received from the pilot valve 71. Since the pressure from this valve may be reduced to a minimum value on a slight increase in the temperature of the article 6, it will be seen that the supply of air and fuel will be regulated in direct response to changes in temperature of the articles for holding their temperature very close to the desired value.

In Fig. 2 there is shown a relay 110 connected slightly different from the relay 63 for controlling the supply of pressure fluid to the passage means 58 in response to changes in pressure from the pilot valves 70 and 71. In this case the valve 70 controls the supply of fluid to the upper side of the diaphragm 67 and to a conduit 111 communicating with the port 61. The valve 71 supplies fluid to the lower side of diaphragm 67 and to a conduit 112 communicating with the port 60. A spring 114 is provided to exert a downward force on the member 65. When the furnace temperature and the temperature of the articles are low, the pressures supplied to the opposite sides of the diaphragm 67 are equal. The spring 114 then forces the member 65 downwardly to open the valve to the conduit 112 until the pressure acting on the lower side of diaphragm 68 balances the spring. As the furnace temperature approaches its maximum desired value, the pressure above diaphragm 67 is reduced and the member 65 moves upwardly to connect the lower side of diaphragm 68 to the conduit 111. The pressure in this conduit is the same as the pressure acting on the upper side of diaphragm 67. If the pressure beneath the diaphragm 67 balances the force exerted by the spring, the pressure supplied from conduit 111 to the lower side of the diaphragm 68 will balance the pressure acting upon the upper side of diaphragm 67. The pressure supplied to the mechanism will then equal the pressure supplied by the valve 70 and will vary in the same manner with changes in furnace temperature. When the temperature of the articles approaches the desired value, the pressure supplied from valve 71 to the lower side of diaphragm 67 is decreased, and the member 65 is moved downwardly to open the connection to conduit 112. If the pressure in this conduit is low enough so that the supply of air and fuel is reduced to a point where the furnace temperature drops, the pressure from valve 70 will increase and tend to hold the member 65 more firmly in a position connecting conduit 112 in communication with the passage means 58. The pressure controlling the positioning of the air damper will then be the same as that discharged by the valve 71 and will vary on slight changes in temperature of the articles for regulating the supply of air and fuel.

Although my invention has been shown for regulating the heating of a furnace, it could as well be applied to the regulation of other conditions in response to different variables without departing from its spirit or the scope of the appended claims.

What I claim as new, and desire to secure by Letters Patent of the United States, is:

1. A system for controlling the operation of a furnace containing articles to be heated comprising, in combination, means responsive to the temperature of said furnace and operating to produce a pressure varying in value as said furnace temperature approaches a maximum desired value, means responsive to the temperature of said articles and operating to produce a pressure varying in value as their temperature approaches a predetermined value somewhat below the furnace temperature, a relay subjected to the pressures produced by said two first mentioned means and operating to supply a pressure varying with the sum of the pressures to which it is subjected, and means for regulating the supply of at least one of the elements of combustion to said furnace in response to the pressure supplied by said relay.

2. A system for controlling the operation of a furnace containing articles to be heated comprising, in combination, means responsive to the temperature of said furnace and operating to produce a pressure decreasing in value as said furnace temperature approaches a maximum desired value, means responsive to the temperature of said articles and operating to produce a pressure decreasing in value as their temperature approaches a predetermined value somewhat below the furnace temperature, a relay subjected to the pressures produced by said two first mentioned means and operating to supply a pressure varying with the sum of the pressures to which it is subjected, and means for regulating the supply of at least one of the elements of combustion to said furnace in response to the pressure supplied by said relay.

3. A system for controlling the operation of a furnace containing articles to be heated comprising, in combination, means responsive to the temperature of said furnace and operating to provide a pressure varying in value as said furnace temperature exceeds a predetermined value, means responsive to the temperature of said articles and operating to produce a pressure varying in value as their temperature exceeds a predetermined value somewhat below the predetermined value for the furnace, a relay subjected to the pressures produced by said two first mentioned means and operating to supply a fluid pressure varying with the pressures to which it is subjected, and means responsive to the pressure supplied by said relay for controlling the supply of at least one of the elements of combustion to said furnace.

4. A system for controlling the operation of a furnace containing articles to be heated comprising, in combination, means responsive to the temperature of said furnace and operating to produce a pressure at a constant value until the temperature reaches a predetermined value and then at a decreasing value as the temperature continues to increase, means responsive to the temperature of said articles and operating to produce a pressure at a constant value until the temperature of the articles reaches a predetermined value below that of said furnace and then at a decreasing value as the temperature of the articles continues to increase, a relay subjected to the pressures produced by said two first mentioned means and operating to supply a pressure varying with the pressures to which it is subjected, and means for regulating the supply of at least one of the elements of combustion to said furnace in response to the pressure supplied by said relay.

5. The system of claim 4 in which the last mentioned means operates to regulate the at least one of the elements of combustion supply in proportion to the changes in pressure supplied to it from said relay.

6. A system for controlling the operation of a furnace containing articles to be heated comprising, in combination, balanceable networks, one arranged to be unbalanced in response to changes in furnace temperature and the other arranged to be unbalanced in response to changes in the temperature of the articles, means including reversible motors operative on unbalance of said networks for rebalancing the latter, pilot valves operatively connected to said motors to separately establish fluid pressures, a pressure responsive relay connected to a source of pressure fluid under the control of the fluid pressures of said pilot valves and supplying a pressure varying with the algebraic sum of the pressures of the fluids separately supplied thereto, and means responsive to the pressure from said relay for controlling the supply of at least one of the elements of combustion to said furnace.

7. A system for controlling the operation of a furnace containing articles to be heated comprising, in combination, balanceable bridge networks, one including an element varying in resistance in response to the furnace temperature for effecting an unbalance thereof, and another including an element varying in resistance in response to the temperature of the articles for effecting an unbalance thereof, means including reversible motors operative on unbalance of said networks for rebalancing the latter, pilot valves operatively connected to said motors and operating to supply fluid at a constant pressure until the temperatures of said furnace and articles have reached predetermined maximum values and then at a decreasing pressure as the temperatures are increased, a relay subjected to the pressures supplied by said pilot valves and operating to supply a pressure varying with the pressures to which it is subjected, and means responsive to the pressures supplied by said relay for controlling the supply of at least one of the elements of combustion to said furnace.

8. The system of claim 7 in which the pilot valve connected to the one of said motors operating on changes in temperature of the articles starts operating to supply fluid at decreasing pressure when the temperature of the articles is below that of the furnace.

9. A furnace and control system with which articles are heated, including, a first heating section through which products of combustion are conducted, a second heated section in heat exchange association with said first section and for retaining the articles, means responsive to the temperature of the first section and operating to produce a pressure varying in value as said first section temperature approaches a maximum desired value, means responsive to the temperature of the articles in the second section and operating to produce a pressure varying in value as the temperature approaches a predetermined value somewhat below the temperature of the first section, a relay subjected to the pressures produced by the two responsive means and operating to supply pressure varying with the sum of the pressures to which it is subjected, and means for regulating the supply of at least one of the elements of combustion to the first section in response to the pressure supplied by said relay.

10. An apparatus for heating articles including, in combination, a furnace heating section through which products of combustion are directed, a heated section associated with the heating section and in which articles are placed for heating, balanceable networks, one arranged to be unbalanced in response to changes in the temperature of the heating section and the other arranged to be unbalanced in response to changes in the temperature of the articles in the heated section, means including reversible motors operative on unbalance of said networks for rebalancing the latter, pilot valves operatively connected to said motors to separately establish fluid pressures, a pressure responsive relay connected to a source of pressure fluid under the control of the fluid pressures of said pilot valves and supplying a pressure varying with the algebraic sum of the pressures of the fluids separately supplied thereto, and means responsive to the pressure from said relay for controlling the supply of at least one of the elements of combustion to the heating section.

11. A furnace and control system therefor with which articles are heated, including, a first heating section through which products of combustion are conducted, a second heated section in heat exchanging association with said first section and for retaining the articles, balanceable bridge networks, one including an element varying in resistance in response to the first section temperature for effecting an unbalance thereof, and another including an element varying in resistance in response to the temperature of the articles in the second section for effecting an unbalance thereof, means including reversible motors operative on unbalance of said networks for rebalancing the latter, pilot valves operatively connected to said motors and operating to supply fluid at a constant pressure until the temperatures of said first section and articles in the second section have reached predetermined maximum values and then at a decreasing pressure as the temperatures are increased, a relay subjected to the pressure supplied by said pilot valves and operating to supply a pressure varying with the pressures to which it is subjected, and means responsive to the pressures supplied by said relay for controlling the supply of at least one of the elements of combustion to said first section.

12. The system of claim 11 in which the pilot valve connected to one of said motors operating on changes in temperature of the articles in the second section starts operating to supply fluid at a decreasing pressure when the temperature of the articles is below that of the first section.

CARL D. HARTMAN.

REFERENCES CITED

The following references are of record in the file of this patent:

UNITED STATES PATENTS

| Number | Name | Date |
|---|---|---|
| 1,650,622 | Geissinger | Nov. 29, 1927 |
| 2,237,038 | Moore | Apr. 1, 1941 |
| 2,264,511 | Dickey | Dec. 2, 1941 |
| 2,285,288 | Krogh | June 2, 1942 |
| 2,328,499 | Saathoff | Aug. 31, 1943 |
| 2,394,061 | Horstkotte | Feb. 5, 1946 |